United States Patent Office
2,810,846
Patented Oct. 22, 1957

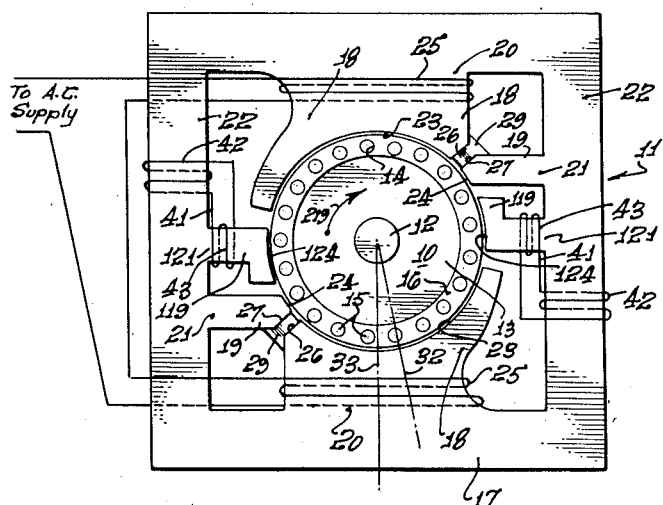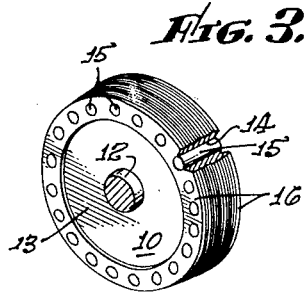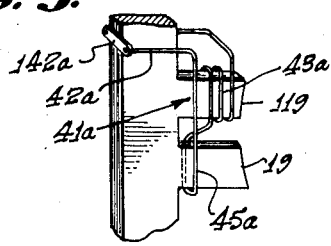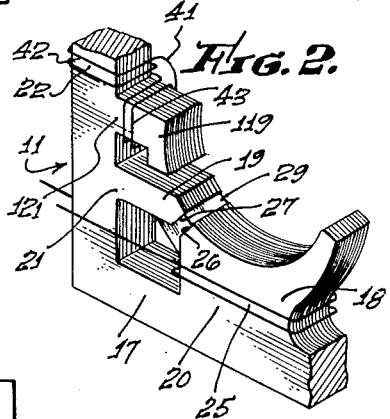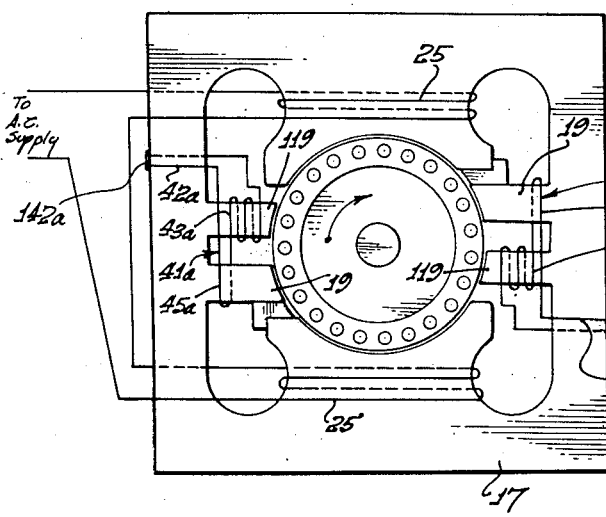

2,810,846

SELF-STARTING SINGLE PHASE ALTERNATING CURRENT MOTORS

Henry H. Hammerstrom and Lee B. Woodruff, Los Angeles, Calif.

Application May 7, 1956, Serial No. 583,008

10 Claims. (Cl. 310—172)

This invention relates to improved alternating current electric motors of a type especially designed for highly efficient self-starting operation on single phase current.

In our Patent No. 2,713,646, issued July 19, 1955, on "Self Starting Alternating Current Motors," we have disclosed a self-starting single phase A. C. motor, in which the starting torque is developed by virtue of a unique manner of shaping and positioning the magnetic metal of the rotor, to develop a rotating magnetic field for turning the rotor. In particular, the stator is designed to have, in addition to its main field poles, means forming a magnetic shunt path adjacent one of the field poles and along which some of the lines of force from a portion of the pole may return to the body of the stator without passage through the rotor. This shunt path is made unsymmetrical circularly with respect to the associated pole, and as a result develops a rotating field giving starting torque to the motor. Preferably, the shunt path is formed by a special shunt pole projecting from the stator body adjacent a main field pole (or a plurality of such poles associated with different field poles).

The present invention is directed to certain improvements in a motor of the above type, for further improving the starting torque of the motor. More specifically, the invention contemplates the provision of an additional auxiliary pole (or poles), and an associated winding (or windings) for assisting in the development of a magnetic polarity beyond the shunt path which is somewhat out of phase and delayed with respect to the field of the associated main field pole, to assist in forming a rotating field. Each such winding has a first portion disposed about a body portion of the stator, between two of the main poles, and has a second portion disposed about an associated one of the auxiliary poles, so that a current is induced in the first portion by magnetic flux in the stator body, and that current flowing through the second portion of the winding tends to set up a magnetic field in the auxiliary pole. This generated magnetic field is delayed with respect to the main field in the stator body, by virtue of the delaying inductance or inductive reactance of the winding, to thus develop an out of phase magnetic relationship between the main field pole and the auxiliary pole, for assisting the starting effect of the shunt pole.

In addition to the above features, it has been found that the starting torque may be further increased by provision of another winding in association with each of the sets of shunt and "auxiliary" poles. This winding preferably has a first portion looped about one of the shunt poles, and a second portion looped about an associated "auxiliary" pole, with the winding desirably being closed or endless electrically, and for best results extending about the two poles reversely.

The above and other features and objects of the present invention will be better understood from the following detailed description of the typical embodiments illustrated in the accompanying drawing, in which:

Fig. 1 is a side view of the rotor and stator of an alternating current electric motor built in accordance with the invention;

Fig. 2 is a fragmentary perspective view of the stator of Fig. 1;

Fig. 3 is a fragmentary perspective view of the Fig. 1 rotor, and

Figs. 4 and 5 are views corresponding to Fig. 1, but showing variational forms of the invention.

Referring first to Figs. 1 to 3, the motor there shown includes a rotor section 10 and a stator section 11. The rotor section includes the usual central shaft 12, and is mounted for rotation relative to the stator by means of suitable bearings (not shown), which are attached to stator 11, and which rotatably journal opposite ends of the rotor shaft.

The rotor may be of essentially conventional squirrel cage construction, including an externally cylindrical magnetic metal rotor body 13, carried by shaft 12. A number of parallel transverse bores or passages 14 are formed in the outer portion of the rotor body 13 near its periphery, and contain a plurality of parallel axially extending large diameter conductors or wires 15, typically formed of copper. The opposite ends of these wires 15 are connected to a pair of electrically conductive rings 16 carried at opposite sides of the rotor, so that wires 15 and the electrically conductive rings 16, usually formed of copper, form together the conventional squirrel cage rotor winding.

The stator section 11 of the device includes a stationary magnetic metal stator body 17, which may be externally square, as shown, and is shaped to form two inwardly projecting diametrically opposed main field poles 18, two circularly intermediate and smaller magnetic shunt poles 19, and two additional small poles 119 located circularly beyond poles 19 respectively. Extending between the outer ends or base portions 20, 21 and 121 of the various poles 18 and 19 and 119, the magnetic material of stator body 17 has portions 22 for conducting magnetic lines of force between the outer ends of the poles. The inner ends of the poles form inwardly directed cylindrically curved pole faces 23, 24 and 124 which are received in closely spaced relation to the outer cylindrical surface of the rotor.

Both the rotor body 13 and the stator body 17 may be formed of a number of identically shaped laminations, as seen in Figs. 2 and 3. These laminations, and therefore the rotor and stator bodies, may be shaped substantially the same as shown in Fig. 1, which is a full size representation of substantially the exact configuration of a rotor and stator combination which has actually been built and very successfully operated.

The two primary or field poles 18 of the stator are energized by a pair of coils 25 extending thereabout and connected in series and reversely to an alternating current power supply, typically 120 volts 60 cycles. As an example, each of these coils may comprise 275 turns of No. 26 B and S insulated copper wire. The intermediate poles 19 and 119 of the device do not have thereabout any energizing coil connected to a power supply, but instead are energized only indirectly by the coils 25 about poles 18.

Each of the poles 18 has, at its circularly leading side, a surface 26 received in rather close proximity to a surface 27 of an adjacent one of the magnetic shunt poles 19. These proximate surfaces 26 and 27 of the main and shunt poles may extend essentially parallel to each other and transversely of the direction of rotary movement of the periphery of the rotor. Between surfaces 26 and 27, there are received a pair of desirably solid (i. e. desirably unlaminated) plugs 29, which form magnetic paths between the main poles 18 and shunt poles 19. Plugs 29 may have the illustrated cross sectional configurations, and may be sufficiently tight fits between the poles to assure effective retention of the plugs in their illustrated positions without the necessity for any special attaching means.

The two poles 119 are located diametrically opposite one another, and are positioned circularly beyond (in the direction 219 of rotor rotation) the two shunt poles 19 respectively. Each of these two poles 119 may be located approximately midway between an adjacent pole 19 and an adjacent pole 18. Also, the two poles 119 may have flange portions 40 projecting circularly toward poles 19.

Associated with each of the auxiliary starting poles 119, there is provided a winding 41 which acts to energize that pole in delayed relation to the energization of main field poles 18, to thus assist shunt poles 19 in developing an adequate starting torque. Each of these windings 41 forms a closed or endless winding, a portion of which is disposed about one of the poles 119, and another portion of which is wound about the portion 22 of the stator body. Preferably, winding 41 forms at least one or more complete turns about pole 119, and one or more complete turns about portion 22 of the stator body. Also, it is desirable that the portion 42 disposed about the stator body 22 extends about that body at a location circularly beyond pole 119 in the direction of rotor travel, but short of the next successive pole 18 in that direction. The portions 42 and 43 should desirably extend about the stator body and pole 119 in the directions illustrated, the relation being these directions being definable as follows: If the pole 119 is considered as a continuation of the portion of body 22 about which winding portion 42 extends, then the winding 41 extends about pole 119 in the same circular direction as about the body 22.

For best results, the portion 42 of winding 41 disposed about stator body 22 should have an ohmic resistance which is less than the ohmic resistance of the portion 43 of winding 41 disposed about pole 119. As a typical example of an effective winding, the winding 119 may consist of nine turns of No. 20 B and S enameled copper wire wound about pole 119, and three turns of the same wire wound about portion 22 of the stator body.

In discussing the operation of the motor shown in Figs. 1 to 3, first assume that the rotor 13 is initially stationary, and that an alternating current power supply of the proper voltage and frequency is connected to coils 25. When the coils are thus connected to an A. C. power supply, it is found that the construction of the stator and rotor in the illustrated manner results in the development in the stator of a rotating magnetic field, which imparts to the rotor a starting torque acting to commence rotation of the rotor.

In disclosing the manner in which the starting torque is apparently developed, it is best to start the discussion at the point, during a cycle of the A. C. current, at which the actual energizing current is zero. At that instant, the magnetic lines of force passing through the stator poles 18, and through the rotor between these poles, are also substantially zero. As the energizing current within coils 25 then gradually rises, the coils set up a magnetic field extending through the main poles 18 of the stator, and through the body 13 of the rotor in passing between stator poles 18. Some of the lines of force from each of the poles 18 do not follow this path through the rotor and to the opposite pole 18, but instead follow a shunt path through leading portion 26 of the pole 18, plug 29, and shunt pole 19 back to the body 22 of the stator, without passage through the rotor. At the leading side of each main stator pole 18, the provisions of this shunt path results in fewer lines of force passing from that leading portion of the stator pole and into the rotor, than would pass into the rotor for delivery to the opposite stator pole if the shunt path were not provided. Toward the trailing side of the stator poles 18, on the other hand, there is no shunt path provided for draining off part of the magnetic field, and consequently the density of the lines of force passing from each pole 18 to the rotor is greater toward the trailing side of the pole 18 than toward its leading side. As a result, the effective magnetic center of pole 18, during the initial stages of a cycle of increasing energizing current, is offset circularly toward the trailing side of each pole 18, and may typically be considered as extending along the broken line 32 of Fig. 1.

As the current within coils 25 gradually increases, the number of lines of force passing from each pole 18 both into the rotor and through the shunt path gradually and progressively increases. However, the shunt path is so designed as to become substantially saturated with lines of force considerably before the energizing current reaches its peak value, and also considerably before the amount of flux following the main magnetic path through poles 18 and the rotor reaches its peak. Consequently, after the shunt path has become substantially saturated, it will not take any further magnetic lines of force upon further increase in energizing current, and therefore all increased current tends only to increase the portion of the magnetic field which passes through the rotor and not that portion passing through the shunt path. This results in the passage into the rotor of an increasing proportion of the total number of lines of force which are flowing through the leading portion of each pole 18, to in turn cause a shifting, as to the position designated by broken line 33, of the effective magnetic center of each pole 18. As will be appreciated, such circular advancement of the effective center of each pole 18 from line 32 to line 33 during each current cycle causes in effect a rotation of the stator field, which imparts starting torque to the rotor.

In order that the magnetic shunt paths may serve their intended function of producing a rotating magnetic field, it is desirable that the shunt path or paths leading from each of the main poles be magnetically unsymmetrical circularly with respect to the main pole (i. e. in opposite circular directions from the center thereof). It is for this reason that each main pole preferably has associated therewith only one shunt path, at one of its sides.

The magnetic characteristics and spacing of all of the various parts of the device may be so designed as to assure the desired saturation of the magnetic shunt paths considerably before the flux along the main magnetic path through the rotor has reached its maximum. For this purpose, the number of lines of force which pass through each shunt path at saturation, as determined by the saturation capacity of its most easily saturated portion, should be very small as compared with the number of lines of force which pass from the main pole to the rotor, and then through the rotor to the other main pole, when the field through the rotor reaches a maximum. It may also be stated that the shunt path, and particularly its most easily saturated portion through plug 29, should have a saturation capacity for flux and desirably also a minimum cross sectional area which is small as compared with the capacity and minimum effective cross sectional area of each of the main poles 18 and the rotor.

The present invention is particularly concerned with the manner in which the auxiliary poles 119 and windings 41 coact with the shunt poles 19 in further increasing the starting torque which is imparted to the rotor. More particularly, poles 119 and windings 41 act to develop a delayed polarity at the locations of poles 119, which polarity causes in effect a further shift of the overall magnetic field in the device, after the above discussed shift caused by shunt poles. As will be apparent, when main field poles 18 are first energized during a current cycle, by energizing coils 25, a magnetic flux of course flows through portion 22 of the stator body, to complete the main magnetic circuit through the device. This flux flowing through portion 22 of the stator body induces a current in portion 42 of coil 41, which current also flows through portion 43 of coil 41, to thus develop a magnetic polarity in each of the two poles 119. By virtue of the inductance of winding 41, an inductive delay is introduced into this current, so that the polarity generated in poles 119 is automatically out of phase with, and delayed as compared with, the polarity of main poles 18 and shunt poles 19. Thus, after the magnetic circuit of poles 18 has shifted from line 32 to line 33, by the previously described shunt effect, the energization of poles 119 by coils 41 then causes a further circular shifting of the effective center of the overall magnetic field, circularly toward and ultimately past poles 119. Thus, an extremely effective rotating magnetic field is developed, which imparts a very great starting torque to the rotor 10.

Figs. 4 and 5 represent a slightly variational form of the invention, which is very similar to that of Figs. 1 to 3 (similar parts being similarly numbered), except that the endless windings 41a in Figs. 4 and 5 have, in addition to their portions 42a about the stator body and their portions 43a about poles 119, additional portions 45a disposed about pole 19. Each of these portions 45a may typically be only a single turn about one of the poles 19, and portions 42a and 43a may typically be one and three turns respectively. It is found that the addition of the portions 45a of windings 41a increases the effectiveness of the magnetic interaction of poles 19 and 119, in starting the motor.

Preferably, winding 41a extends about pole 19 in a direction the reverse of the direction in which it extends about pole 119, that is, a current flowing through the endless conductor 41a in a predetermined direction flows about pole 19 in a direction the reverse of the direction in which the same current flows about pole 119.

In order to facilitate mounting of the windings 41a on the stator, each of these windings may include a copper link 142a which is adapted to extend across the outer side of the stator as seen in Fig. 5, and connects together the ends of the wire forming the rest of the winding. The wire may be rather stiff (typically No. 20 B and S enameled copper wire) and may be preformed to the illustrated shape and then slipped onto poles 19 and 119 to assembled position, so that the ends of the wire may be passed through openings in the ends of link 142a and then permanently attached to the link by peening.

We claim:

1. An electric motor comprising a stator and a relatively rotatable rotor both having bodies formed of magnetic material, said stator including two field poles of magnetic material having first ends adjacent the rotor and having base ends connected to the stator body, and winding means energizing said poles and setting up a magnetic field extending therebetween through the rotor to turn the rotor, said stator body forming a magnetic path along which lines of force produced by said winding means flow between said base ends of said two field poles, said stator including magnetic shunt path means through which some of the magnetic field of one of said poles is shunted from a portion thereof back to the stator body along a path other than through the rotor or through said base end of said one pole, said shunt path means being magnetically unsymmetrical circularly with respect to said one pole to impart a starting torque to the rotor, said stator including an additional pole of magnetic material projecting from said stator body into close proximity to said rotor at a location circularly between said field poles, and an additional winding having a first portion disposed about said stator body as it extends between said field poles and having a second portion disposed about said additional pole to generate a phase displaced field in the latter for assisting said shunt path means in starting the rotor, said additional winding forming a closed endless conductor having said first and second portions thereof interconnected in series and looped about said stator body and said additional pole respectively.

2. An electric motor comprising a stator and a relatively rotatable rotor both having bodies formed of magnetic material, said stator including two field poles of magnetic material having first ends adjacent the rotor and having base ends connected to the stator body, and winding means energizing said poles and setting up a magnetic field extending therebetween through the rotor to turn the rotor, said stator body forming a magnetic path along which lines of force produced by said winding means flow between said base ends of said two field poles, said stator including magnetic shunt path means through which some of the magnetic field of one of said poles is shunted from a portion thereof back to the stator body along a path other than through the rotor or through said base end of said one pole, said shunt path means being magnetically unsymmetrical circularly with respect to said one pole to impart a starting torque to the rotor, said stator including an additional pole of magnetic material projecting from said stator body into close proximity to said rotor at a location circularly between said field poles, and an additional winding having a first portion disposed about said stator body as it extends between said field poles and having a second portion disposed about said additional pole to generate a phase displaced field in the latter for assisting said shunt path means in starting the rotor, said second portion of said additional winding disposed about said additional pole having a greater ohmic resistance than has said first portion thereof which is disposed about the stator body.

3. An electric motor comprising a stator and a relatively rotatable rotor both having bodies formed of magnetic material, said stator including two field poles of magnetic material having first ends adjacent the rotor and having base ends connected to the stator body, and winding means energizing said poles and setting up a magnetic field extending therebetween through the rotor to turn the rotor, said stator body forming a magnetic path along which lines of force produced by said winding means flow between said base ends of said two field poles, said stator including magnetic shunt path means through which some of the magnetic field of one of said poles is shunted from a portion thereof back to the stator body along a path other than through the rotor or through said base end of said one pole, said shunt path means being magnetically unsymmetrical circularly with respect to said one pole to impart a starting torque to the rotor, said stator including an additional pole of magnetic material projecting from said stator body into close proximity to said rotor at a location circularly between said field poles, and an additional winding having a first portion disposed about said stator body as it extends between said field poles and having a second portion disposed about said additional pole to generate a phase displaced field in the latter for assisting said shunt path means in starting the rotor, said additional winding having another portion disposed about said shunt path means.

4. An electric motor as recited in claim 3, in which said additional winding is disposed about said additional pole in one direction and about said shunt path means in a reverse direction.

5. An electric motor comprising a stator and a relatively rotatable rotor both having bodies formed of magnetic material, said stator including two field poles of magnetic material having first ends adjacent the rotor and having base ends connected to the stator body, and winding means energizing said poles and setting up a magnetic field extending therebetween through the rotor to turn the rotor, said stator body forming a magnetic path along which lines of force produced by said winding means flow between said base ends of said two field poles, said stator including a magnetic shunt pole projecting into close proximity to the rotor and through which some of the magnetic field of one of said poles is shunted from a portion thereof back to the stator body along a path other than through the rotor or through said base end of said one pole, said shunt pole being magnetically unsymmetrical circularly with respect to said one pole to impart a starting torque to the rotor, said stator including an additional pole of magnetic material projecting from said stator body into close proximity to said rotor at a location circularly between said field poles said shunt pole being adjacent one side of said field pole and circularly between said one field pole and said additional pole, and an additional winding forming a closed endless conductor having a first portion looped about said stator body as it extends between said field poles and having a second portion interconnected in series with said first portion and looped about said additional pole to generate a phase displaced field in the latter for assisting said shunt path means in starting the rotor, said winding having a third portion extending about said shunt pole in a direction the reverse of the direction in which it extends about said additional pole.

6. An electric motor as recited in claim 5, in which each of said field poles has associated therewith one of said shunt poles, one of said additional poles, and one of said additional windings.

7. An electric motor as recited in claim 6, in which said first portion of the additional winding is disposed about said body of the stator circularly beyond the location of said additional pole.

8. An electric motor comprising a stator and a relatively rotatable rotor both having bodies formed of magnetic material, said stator including two field poles of magnetic material having first ends adjacent the rotor and having base ends connected to the stator body, and winding means energizing said poles and setting up a magnetic field extending therebetween through the rotor to turn the rotor, said stator body forming a magnetic path along which lines of force produced by said winding means flow between said base ends of said two field poles, said stator including magnetic shunt path means through which some of the magnetic field of one of said poles is shunted from a portion thereof back to the stator body along a path other than through the rotor or through said base end of said one pole, said shunt path means being magnetically unsymmetrical circularly with respect to said one pole to impart a starting torque to the rotor, said stator including an additional pole of magnetic material projecting from said stator body into close proximity to said rotor at a location circularly between said field poles, and an additional winding having a first portion looped about said stator body as it extends between said field poles and having a second portion looped about said additional pole and interconnected in series therewith in a closed circuit to generate a phase displaced field in the additional pole for assisting said shunt path means in starting the rotor.

9. An electric motor as recited in claim 8, in which said first portion of the additional winding is looped about said body of the stator circularly beyond the location of said additional pole.

10. An electric motor as recited in claim 8, in which each of said poles has associated therewith one of said shunt poles, one of said additional poles, and one of said additional windings.

References Cited in the file of this patent
UNITED STATES PATENTS
2,492,207  Ballentine _____ Dec. 27, 1949